(12) United States Patent
Page

(10) Patent No.: US 9,749,290 B2
(45) Date of Patent: Aug. 29, 2017

(54) DISTRIBUTING AND VIRTUALIZING A NETWORK ADDRESS TRANSLATION (NAT)

(71) Applicant: Verizon Patent and Licensing Inc., Basking Ridge, NJ (US)

(72) Inventor: Jake A. Page, Sachse, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 35 days.

(21) Appl. No.: 14/080,445

(22) Filed: Nov. 14, 2013

(65) Prior Publication Data

US 2015/0131664 A1     May 14, 2015

(51) Int. Cl.
*H04L 29/12* (2006.01)
*H04L 12/741* (2013.01)

(52) U.S. Cl.
CPC ...... *H04L 61/2521* (2013.01); *H04L 61/2532* (2013.01); *H04L 45/54* (2013.01); *H04L 61/103* (2013.01); *H04L 61/2084* (2013.01); *H04L 61/2514* (2013.01)

(58) Field of Classification Search
CPC ... H04L 61/103; H04L 61/25; H04L 61/2514; H04L 61/2521; H04L 61/2532; H04L 61/255
See application file for complete search history.

(56) References Cited

U.S. PATENT DOCUMENTS

| | | | | |
|---|---|---|---|---|
| 6,292,836 B1* | 9/2001 | Teraoka | ............... | H04L 69/161 709/236 |
| 8,724,626 B1* | 5/2014 | Caputo, II | .............. | H04L 45/50 370/252 |
| 2011/0096782 A1* | 4/2011 | Park | .................. | H04L 29/12367 370/392 |
| 2012/0131142 A1* | 5/2012 | Flinck | .................. | G06F 9/5016 709/217 |
| 2012/0180122 A1* | 7/2012 | Yan et al. | ....................... | 726/15 |
| 2013/0151661 A1* | 6/2013 | Koponen et al. | ............. | 709/217 |

* cited by examiner

*Primary Examiner* — Feben M Haile

(57) ABSTRACT

A method, apparatus, and system for distributing and vitalizing a NAT are described. The method includes: maintaining a mapping table associating first and second endpoint addresses of a device, the first and second endpoint addresses indicating the device for first and second routers, respectively; maintaining a routing table for routing between the first and second routers, the routing table associating the first and second routers with first and second location addresses, respectively; and forwarding the first and/or second endpoint addresses to a selected router, the selected router being one of the first router, the second router, or a router exchanging network traffic between the first and second routers, wherein the selected router translates network traffic indicating the first endpoint address to indicate the second endpoint address.

21 Claims, 10 Drawing Sheets

400

DISTRIBUTING AND VIRTUALIZING A NETWORK ADDRESS TRANSLATION (NAT)

BACKGROUND INFORMATION

Networking technologies for translating network (e.g., Internet Protocol (IP)) addresses, such as one-to-one network address translation (NAT), allow for flexible network topologies, such as private networks addresses behind a single public IP address. However, as the size of a network increases, multiple issues may result from the use of traditional NAT processes. For example, traditional NAT processes are frequently not collocated with provider equipment resulting in higher latency. Additionally, traditional NAT processes may create a point of demarcation of network control and visibility for reporting, thereby reducing a service provider's ability to monitor network performance. Furthermore, the use of virtual private network topologies allowing overlapping address space, for instance, as described in request for comment (RFC) 1918, inside a virtual routing/forwarding instance (VRF) of a public IP (PIP) layer 3 virtual private network (L3VPN) product may further exacerbate such issues.

Therefore, there is a need for approaches allowing for a NAT topology for large networks, particularly networks utilizing location/identity and virtual private network topologies.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DESCRIPTION OF THE PREFERRED EMBODIMENT

A preferred method, apparatus, and system for distributing and vitalizing a NAT are described. In the following description, for the purposes of explanation, numerous specific details are set forth in order to provide a thorough understanding of the preferred embodiments of the invention. It is apparent, however, that the preferred embodiments may be practiced without these specific details or with an equivalent arrangement. In other instances, well-known structures and devices are shown in block diagram form in order to avoid unnecessarily obscuring the preferred embodiments of the invention.

Figure 1:
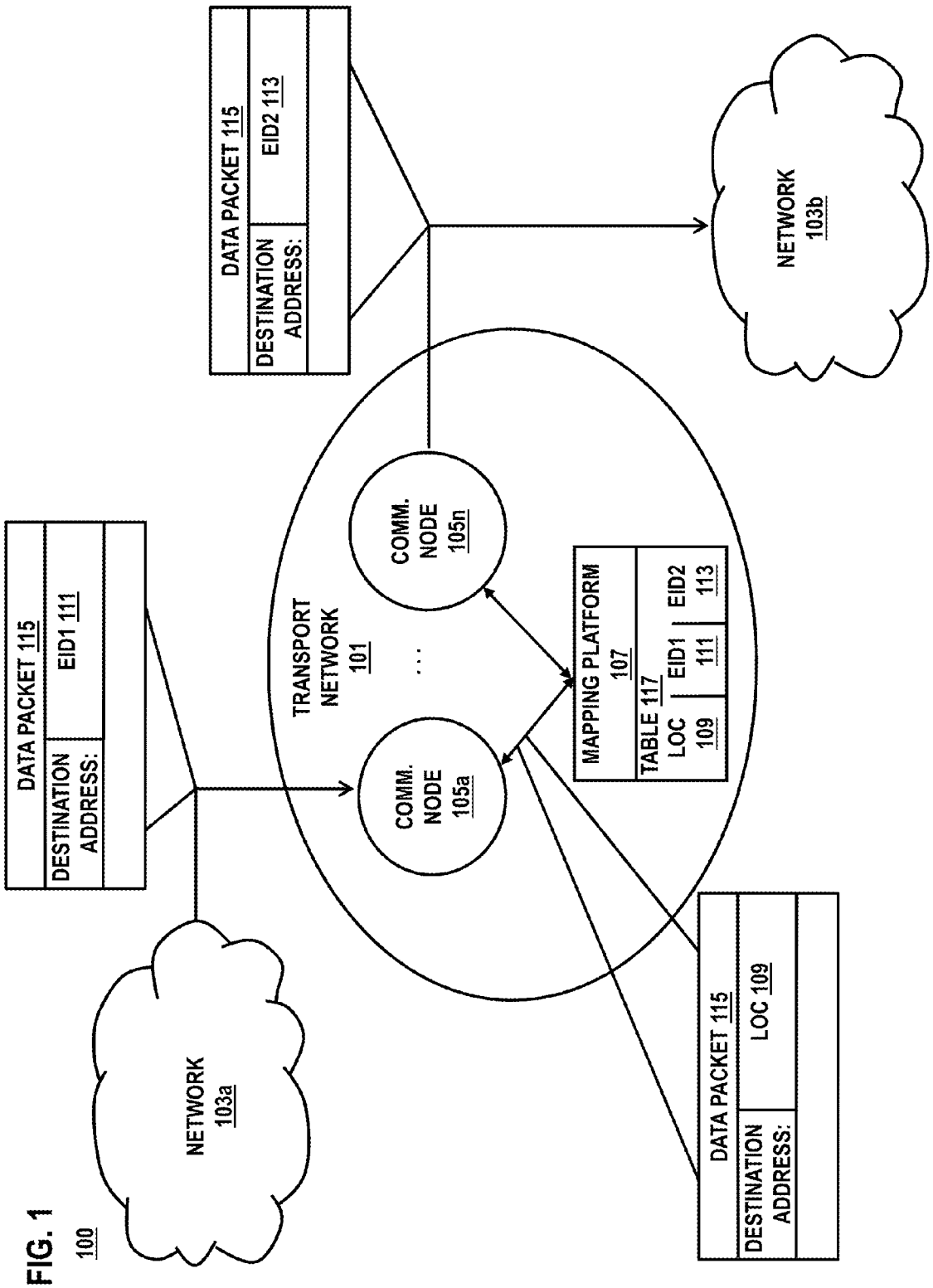
FIG. 1 is a diagram of a communication system capable of providing NAT functionality, according to various embodiments.

FIG. 1 is a diagram of a communication system capable of providing NAT functionality, according to various embodiments. For illustrative purposes, system 100 is described with respect to a transport network 101 for transporting network traffic between networks 103. Depending on the particular implementation, the transport network 101 can utilize various routing technologies, protocols, topologies such as location/identity separation protocol (LISP) for improved routing and layer 3 virtual private network (L3VPN) to enable private networking. In this example, the transport network 101 includes a mapping platform 107 configured to translate network addresses for transporting network traffic through the transport network 101. For instance, mapping platform 107 performs a look-up of a location (LOC) address 109 (and EID2 113) using the end identifier (EID1) 111 of network 103a and forwards the information to the nodes 105. The ingress node 105a appends the destination address of data packet 115 received indicating the EID1 111 to include the LOC address 109 and forwards the packet 115. The egress node 105n then strips the LOC address 109 and translates the destination address of data packet 115 from the EID1 111 to the EID2 113 and forwards the packet 115 to network 103b. As discussed below, the platform 107 may alternatively select another node 105 (e.g., ingress node 105a) to translate the destination address of data packet 115 from the EID 111 to EID 113.

As mentioned, NAT processes allow for more flexible networks. However, networks utilizing traditional NAT processes become increasingly difficult to implement as size increases. Furthermore, such a difficulty in implementation increases when supporting various technologies, such as virtual private networks and location/identity topologies.

To address this issue, the system 100 of FIG. 1 introduces a capability to distribute and virtualize NAT functionality. In some embodiments, the mapping platform 107 selects nodes 105a or 105n of transport network 101 to translate destination address information of network traffic. For instance, mapping platform 107 may select an egress node 105n to translate the destination address from EID 111 to EID 113 based on a translation load imbalance of nodes 105. Furthermore, the mapping platform 107 may be configured to associate tables with (private) networks to allow further network flexibility. For instance, table 117 may be associated with network 103b and another table associated with another network may have overlapping network spaces or even identical network addresses.

In some embodiments, the transport network 101 and/or nodes 105 interact with one or more networks, such as a data network, telephony network, wireless network, and/or service provider network. Such networks may be any suitable wireline and/or wireless network, and be managed by one or more service providers. For example, networks 103 may include any local area network (LAN), metropolitan area network (MAN), wide area network (WAN), the Internet, or any other suitable packet-switched network, such as a commercially owned, proprietary packet-switched network, such as a proprietary cable or fiber-optic network. For example, networks 103 may include a computing device, such as a VoIP phone, skinny client control protocol (SCCP) phone, session initiation protocol (SIP) phone, IP phone, personal computer, softphone, workstation, terminal, server, etc. Networks 103 may include a circuit-switched network, such as the public switched telephone network (PSTN), an integrated services digital network (ISDN), a private branch exchange (PBX), or other like network. For instance, a voice station may be any suitable plain old telephone service (POTS) device, facsimile machine, etc. Meanwhile, networks 103 may include a wireless network employing various technologies including, for example, code division multiple access (CDMA), long term evolution (LTE), enhanced data rates for global evolution (EDGE), general packet radio service (GPRS), mobile ad hoc network (MANET), global system for mobile communications (GSM), Internet protocol multimedia subsystem (IMS), universal mobile telecommunications system (UMTS), etc., as well as any other suitable wireless medium, e.g., microwave access (WiMAX), wireless fidelity (WiFi), satellite, and the like.

According to certain embodiments, networks 103 interact with mobile devices which may be any type of mobile terminal including a mobile handset, mobile station, mobile unit, multimedia computer, multimedia tablet, communicator, netbook, Personal Digital Assistants (PDAs), smartphone, media receiver, etc. It is also contemplated that such mobile devices may support any type of interface for supporting the presentment or exchange of data. In addition, such mobile devices may facilitate various input means for receiving and generating information, including touch screen capability, keyboard and keypad data entry, voice-based input mechanisms, accelerometer (e.g., shaking the mobile device), and the like. Any known and future implementations of mobile devices are applicable. It is noted that, in certain embodiments, mobile devices may be configured to transmit information (e.g., audio signals, words, address, etc.) using a variety of technologies—e.g., near field communications (NFC), BLUETOOTH, infrared, etc. Also, connectivity may be provided via a wireless local area network (LAN). By way of example, a group of mobile devices may be configured to a common LAN so that each device can be uniquely identified via any suitable network addressing scheme. For example, the LAN may utilize the dynamic host configuration protocol (DHCP) to dynamically assign "private" DHCP internet protocol (IP) addresses to each mobile device, e.g., IP addresses that are accessible to devices connected to the networks 103 as facilitated via a router.

It is further contemplated that the networks 103 (and 101) may include components and facilities to provide for signaling and/or bearer communications between the various components or facilities of the system 100. In this manner, the networks 103 (and 101) may embody or include portions of a signaling system 7 (SS7) network, IMS, or other suitable infrastructure to support control and signaling functions.

While specific reference will be made thereto, it is contemplated that the system 100 may embody many forms and include multiple and/or alternative components and facilities.

Figure 2:
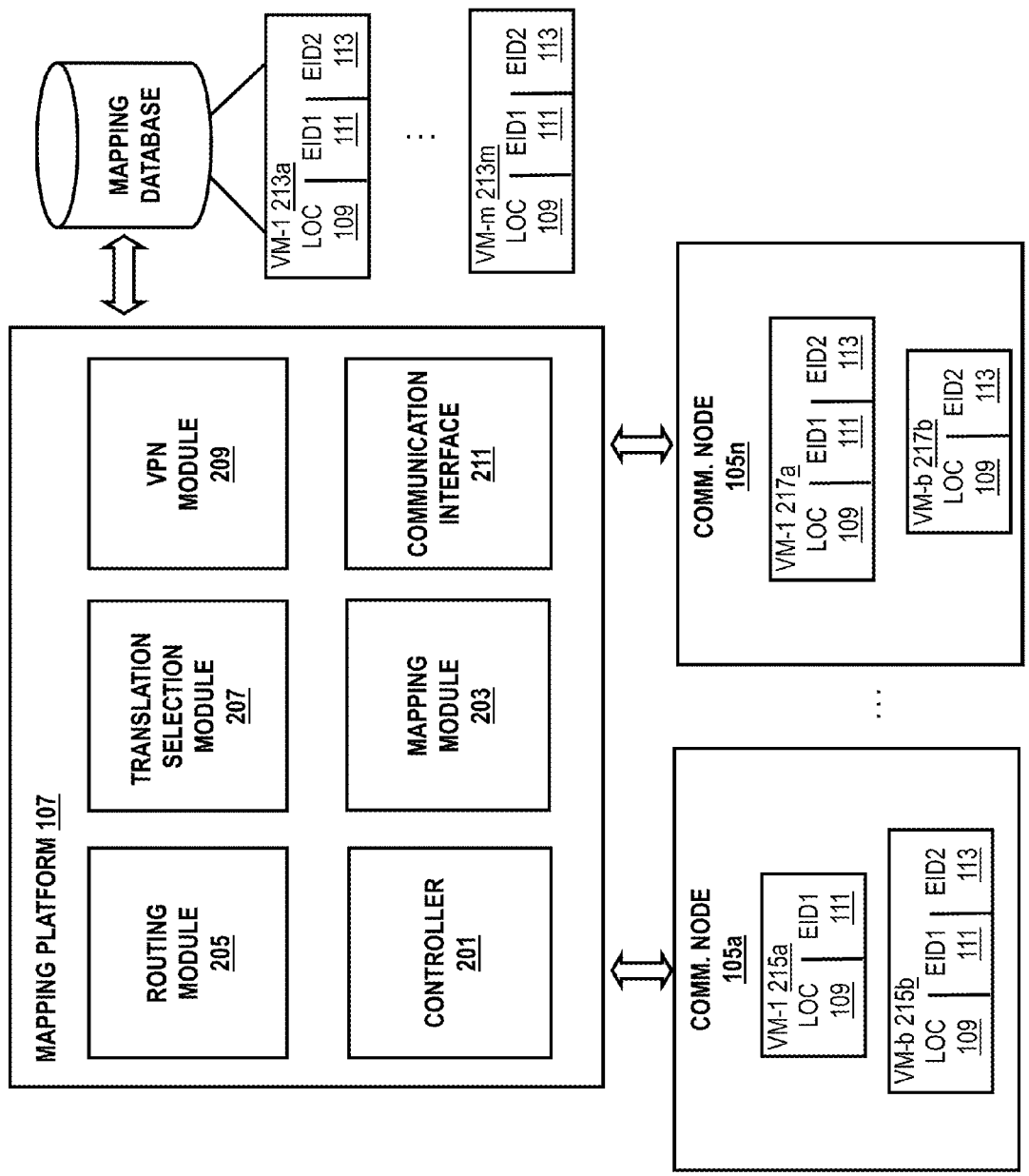
FIG. 2 is a diagram of a platform capable of providing NAT functionality, according to various embodiments.

FIG. 2 is a diagram of a platform capable of providing NAT functionality, according to various embodiments. The mapping platform 107 may comprise computing hardware (such as described with respect to FIGS. 8 and 9), as well as include one or more components configured to execute the processes described herein for providing NAT functionality for data packets of networks (e.g., 101, 103, etc.) of the system 100. It is contemplated that the functions of these components may be combined in one or more components or performed by other components of equivalent functionality. In one implementation, the platform 107 includes a controller 201, mapping module 203, routing module 205, translation selection module 207, VPN module 209, and communication interface 211.

The controller 201 executes at least one algorithm for executing functions of platform 107. For example, the controller 201 interacts with the mapping module 203 to identify destination address information and forwards the address information to a node 105 determined by translation selection module 207. The controller 201 may additionally or alternatively interact with VPN module 209 to associate a network (e.g., 103a) with a mapping table instance 213a and another network (e.g., 103n) with mapping table instance 213m.

The mapping module 203 is configured to associate addresses for routing. For instance, the mapping module 203 maintains mapping table instances 213 correlating a public IP address for a device, a private address for the device, and a location address of a node 105 for the device. Additionally, the mapping module 203 may facilitate a caching of associated address by the nodes 105 in tables (e.g., 215 and 217). For instance, the mapping module 203 forwards LOC address 109 to a node (e.g., 105a) for caching in response to the node requesting a location address corresponding to an EID (e.g., 111, 113, etc.). In some embodiments, the mapping module 203 forwards associated addresses (e.g., LOC, EID, etc) to a node (e.g., 105) for translating a destination address in response to receiving an address (e.g., LOC, EID, etc). For example, the mapping module 203 forwards the LOC address 109, EID1 111, and EID2 113 to node 105n for caching in response to the node requesting the location address. It is noted that the mapping module 203 may associate various networking parameters in addition to an address, for instance, a port number and/or NAT details to support NAT and/or network address translation and network address port translation.

The routing module 205 is configured to facilitate an exchange of network traffic with other nodes (e.g., nodes 105a-105n) of the transport network 101. For instance, the routing module 205 maintains a routing table indicating pathways and tunnels for routing traffic. In some embodiments, the routing tables are continuously or continually maintained.

The translation selection module 207 is configured to select a node for translating a destination address of a data packet. For instance, the translation selection module 207 selects node 105a (or node 105n) for data packet 115 based on node 105a being an ingress into (or egress from) the transport network 101. In another example, the translation selection module 207 selects node 105a based on a translation load balance for translating packet headers. In yet another example, the translation selection module 207 selects a node 105 based on a manual configuration and/or on a third party capacity management software. In this manner, utilization of network resources (e.g., nodes 105) of transport network 101 may be optimized. It is contemplated that the selection module 207 may additionally or alternatively select a (cloud based) virtual machine or other NAT device to strip and/or adjust a header for translating.

VPN module 209 is configured to associate a network with a table instance. For example, network 103a registers with the VPN module 209 to allow network 103a (and 103n) to utilize private network addresses. As such, the VPN module 209 works with the mapping module 203 to maintain a mapping table instance 213a for network 103a (and 103n). In some instances, addresses of mapping table instances 213 may be overlapping or identical. As noted, a single mapping table instance 213a may be associated with a plurality of networks 103. Mapping table instances 213 may be associated with a private network utilizing various protocols, for instance, RFC 1918 private address space, PIP L3VPN and the like. Additionally, the nodes 105 may comprise of cache or tables (e.g., 215 and 217) associating (part of) mapping table instances 213, for example, mapping table instances 213 containing addresses previously used by a respective node.

The platform 107 further includes a communication interface 211 to communicate with nodes 105 of transport network 101 and other components of system 100. The communication interface 211 may include multiple means of communication. For example, the communication interface 211 may be able to communicate, over wired and/or wireless, broad-band and/or narrow-band wireless technology, encrypted or unencrypted, secured or unsecured, proprietary or not proprietary, etc.

It is contemplated that to prevent unauthorized access, platform 107 of transport network 101 may include an authentication identifier when exchanging signals within transport network 101 and when exchanging signals outside the network, for instance, with networks 103. For example, control messages may be encrypted, either symmetrically or asymmetrically, such that a hash value, for instance, can be utilized to authenticate received images, as well as ensure that those signals have not been impermissibly detected in transit. As such, communications between networks 101 and 103 may include various identifiers, keys, random numbers, random handshakes, digital signatures, and the like.

Figure 3:
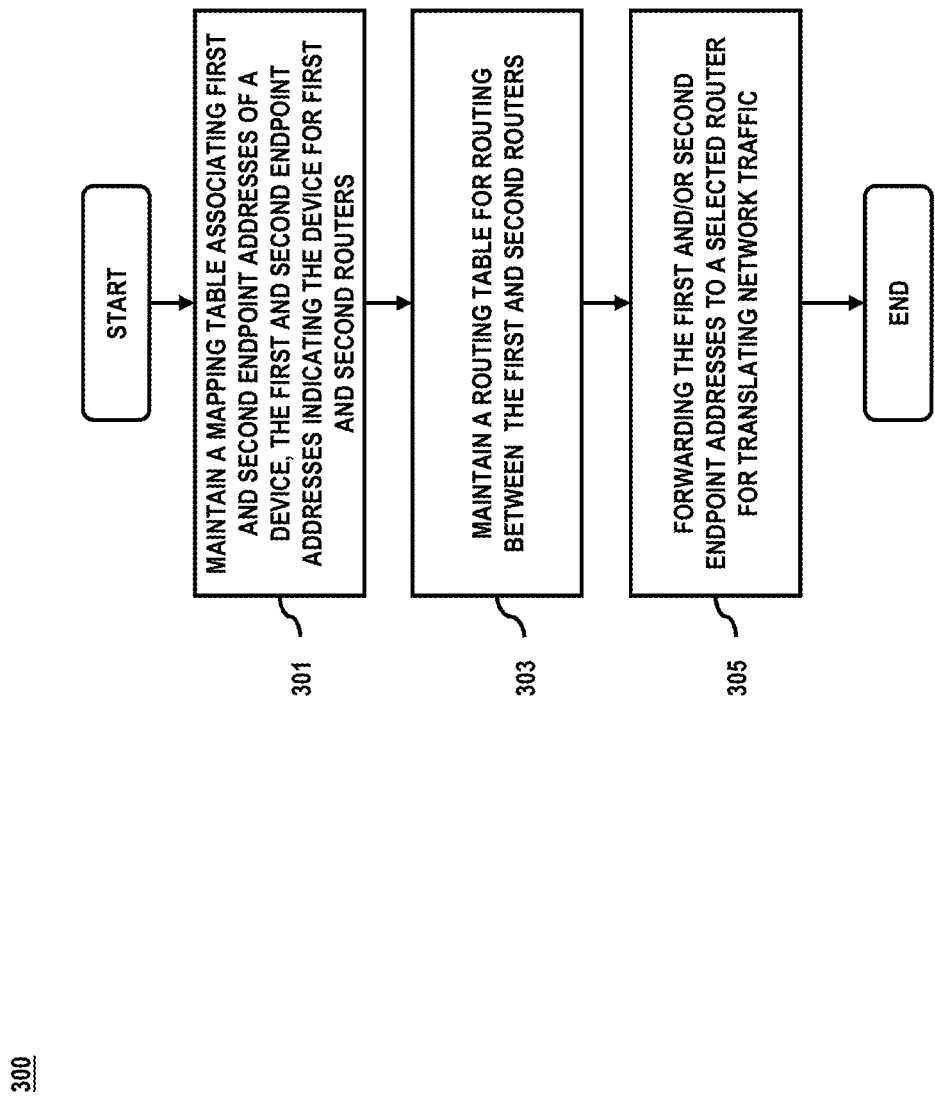
FIG. 3 is a flowchart of a process for providing NAT functionality, according to various embodiments.

FIG. 3 is a flowchart of a process for providing NAT functionality, according to one embodiment. For illustrative purpose, process 300 is described with respect to the exemplary system of FIG. 1 and platform of FIG. 2. It is noted that the steps of process 300 may be performed in any suitable order, as well as combined or separated in any suitable manner.

In step 301, the mapping module 203 maintains a mapping table associating first and second endpoint addresses of a device. For example, the mapping platform 107 maintains table 117 to correspond a LOC 109 with an EID 111 of network 103a and an EID 113 of network 103b for a device of network 103b. In some instances, the first and second endpoint addresses (e.g., EID 111 and 113) indicate the device for first and second routers (e.g., proxy tunnel routers). For instance, routing of data packet 115 within network 103a is via a first router using a first routing table that includes EID 111 and routing of data packet 115 within network 103n is via a second router using a second routing table that includes EID 113.

The routing module 205 maintains, as in step 303, a routing table for routing between the first and second routers. For instance, the routing module 205 maintains various routes and pathways for transporting network traffic to a LOC (e.g., 109) indicated in a data packet (e.g., 115). In some instances, a LOC (e.g., 109) indicates a node (e.g., 105). Next, in step 305, the translation selection module 207 selects a router for translating network traffic and the mapping module 203 works with the communication interface 211 to forward the first and/or second endpoint addresses to a selected router for translating network traffic. For instance, the platform 107 selects node 105n due to load balancing and forwards the EID 113 (and EID 111) along with an indication to translate data packet 115. In one embodiment, the platform 107 selects a node exchanging network traffic between nodes 105a and 105n. For instance, platform 107 selects node 105b due to load balancing and forwards the LOC 109, EID 113, and EID 111 to node 105b and the node 105b subsequently translates data packet 115 accordingly.

Figure 4:
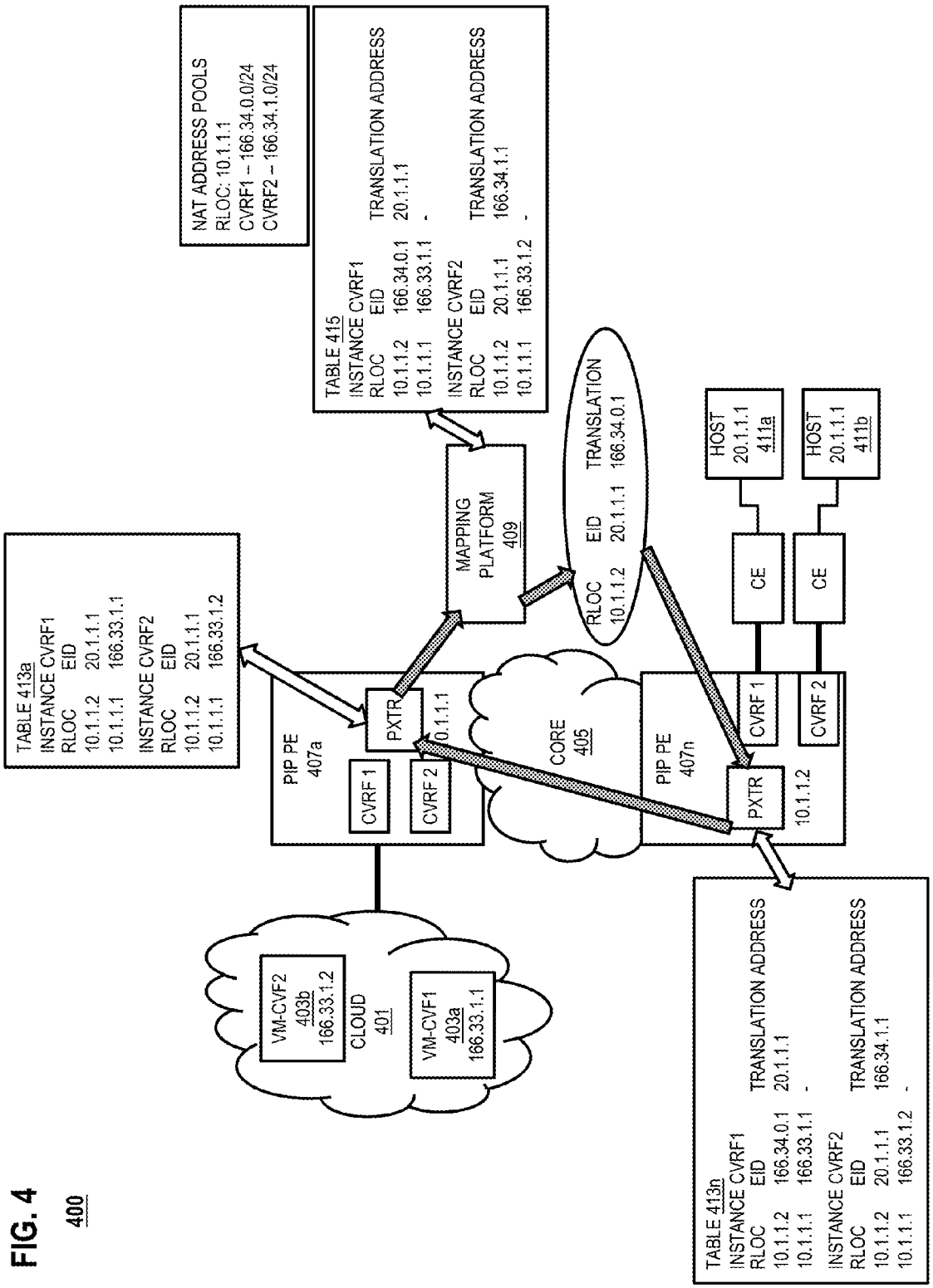
FIG. 4 is a diagram of a NAT process implemented at an egress from a transport network, according to various embodiments.

FIG. 4 is a diagram of a NAT process implemented at an egress from a transport network, according to one embodiment. For illustrative purpose, FIG. 4 is described with respect to the ladder diagrams of FIGS. 5A and 5B, and the platform 107 of FIG. 2.

The exemplary system 400 of FIG. 4 includes a cloud provider 401 (e.g., network 103) having virtual machine (VM) instances 403, a core network 405 (e.g., 101) having public IP provider equipment (PIP PE) 407, a mapping platform 409 (e.g., 201), and host equipment 411 (e.g., network 103). The cloud 401 may alternatively include one and more than two instances and the PIP PE 407 may alternatively be connected to none, one, and more than two hosts 411. As shown each of the PIP PE 407 has a cache or table 413 and the platform 409 maintains a table 415. Additionally, each of the PIP PE 407 include a proxy (ingress/egress) tunnel router (PXTR) used to translate LISP to non-LISP protocols and cloud 401 and hosts 411 are not configured to run LISP. LISP may include, for instance, a pull protocol using IPinIP to stack a RLOC and EID.

Figure 5A:
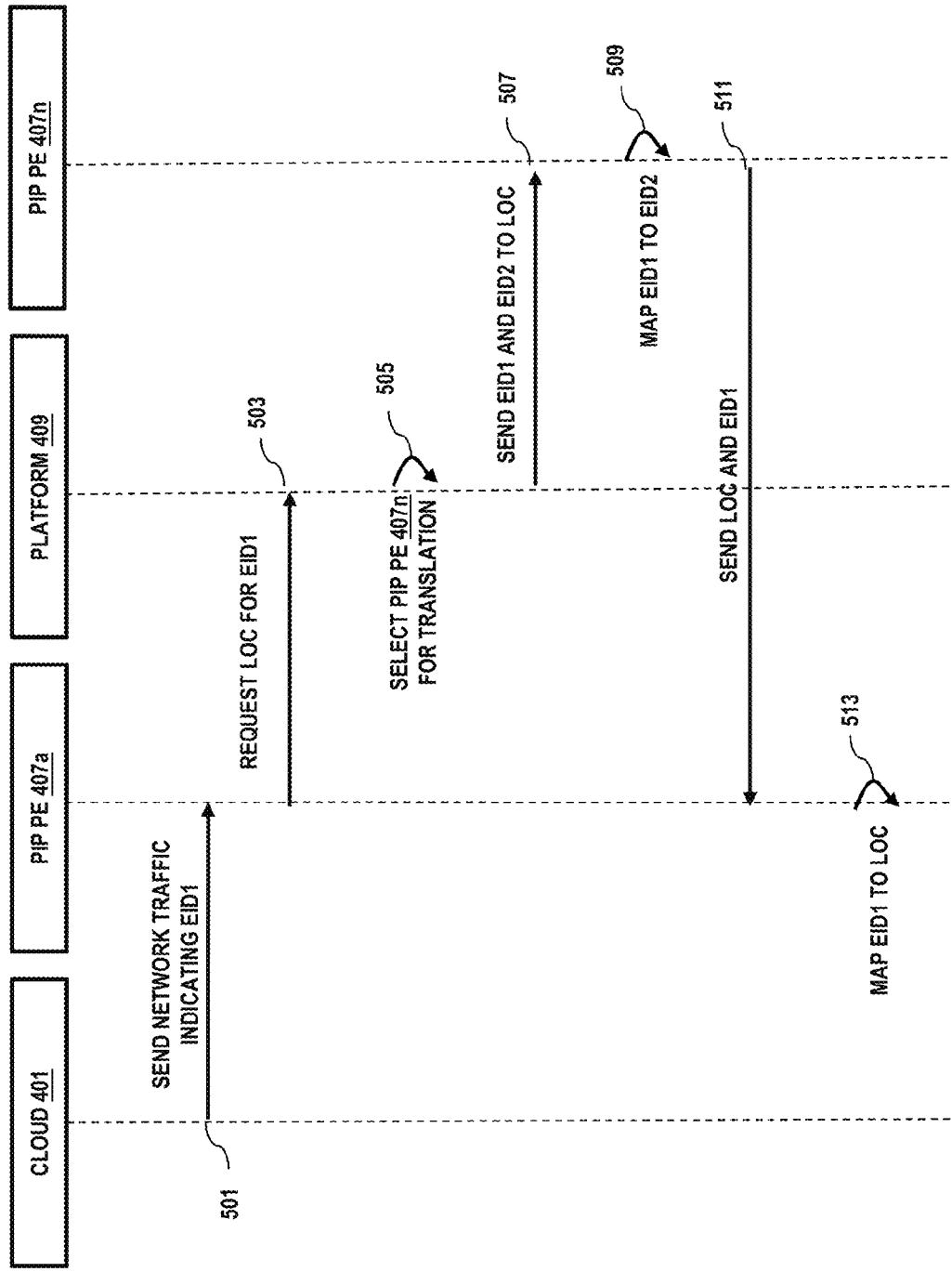
FIGS. 5A and 5B are ladder diagrams of a NAT process implemented at an egress from a transport network, according to various embodiments.

Adverting to FIG. 5A, the cloud 401 sends, as in step 501, network traffic of VM instance 403a indicating a destination address of EID1 (e.g., 166.34.01) to PIP PE 407a. It is contemplated that various NAT information may be included with or instead of the EID1, for instance NAT information described in Request for Comments: 3022 (Traditional IP Network Address Translator (Traditional NAT)), such as, for instance, a port number and NAT details to support a NAT and network address translation and network address port translation.

Next, in step 503, the PIP PE 407a sends a request indicating the EID1 for a corresponding LOC address to the platform 409. The platform 409 selects, as in step 505, PIP PE 407n for translation of the network traffic according to the translation selection module 207, for instance, based on a load balancing of PIP PE 407. Additionally, or alternatively, PIP PE 407n may be selected based on a manual configuration of platform 101, a NAT orchestration controller based on a third party capacity management software, and the like. Further, a (cloud based) virtual machine or other NAT device could additionally or alternatively adjust a header of the network traffic. For example, the PIP PE 407n initiates a (cloud based) virtual machine or other NAT device to adjust a header of network traffic by sending an indication of the LOC address, sending a request with the EID1, and the like. The platform 409 then performs a look-up of table 415 for the LOC address (e.g., 10.1.1.2) and EID2 (20.1.1.1) associated with EID1 and VM instance 403a.

Next, the platform 409 sends, as in step 507, the EID1 and the EID2 to PIP PE 407n using the LOC address. In step 509, the PIP PE 407n maps the EID1 and EID2 addresses in table 413n. In one embodiment, the table 413 includes parameters for a LOC address, EID, and a translation address. As such, PIP PE 407 translates network traffic indicating the EID to indicate the translation address prior to forwarding. For instance, table 413n includes a sub-table for VM instance 403a associating the LOC (e.g., 10.1.1.2) and EID1 (e.g., 166.34.0.1) with a translation address indicating EID2 (e.g., 20.1.1.1) to indicate that PIP PE 407n translates network traffic indicating the EID1 to indicate EID2 prior to forwarding. Next, PIP PE 407n forwards, as in step 511, the LOC address to PIP PE 407a. For instance, PIP PE 407a receives the LOC address and EID1 and maps, as in step 513, them in table 413a for VM instance 403a. Once the steps of 503-513 are completed, the mapping steps of 509 and 513 (and selection step of 505) enable steps 503-513 to be omitted for subsequent network traffic. For instance, subsequent network traffic from cloud 401 on VM instance 403*a* indicating the EID1 may be forwarded by PIP PE 407*a* to PIP PE 407*n* using table 413*a* without performing steps 503-513.

Figure 5B:
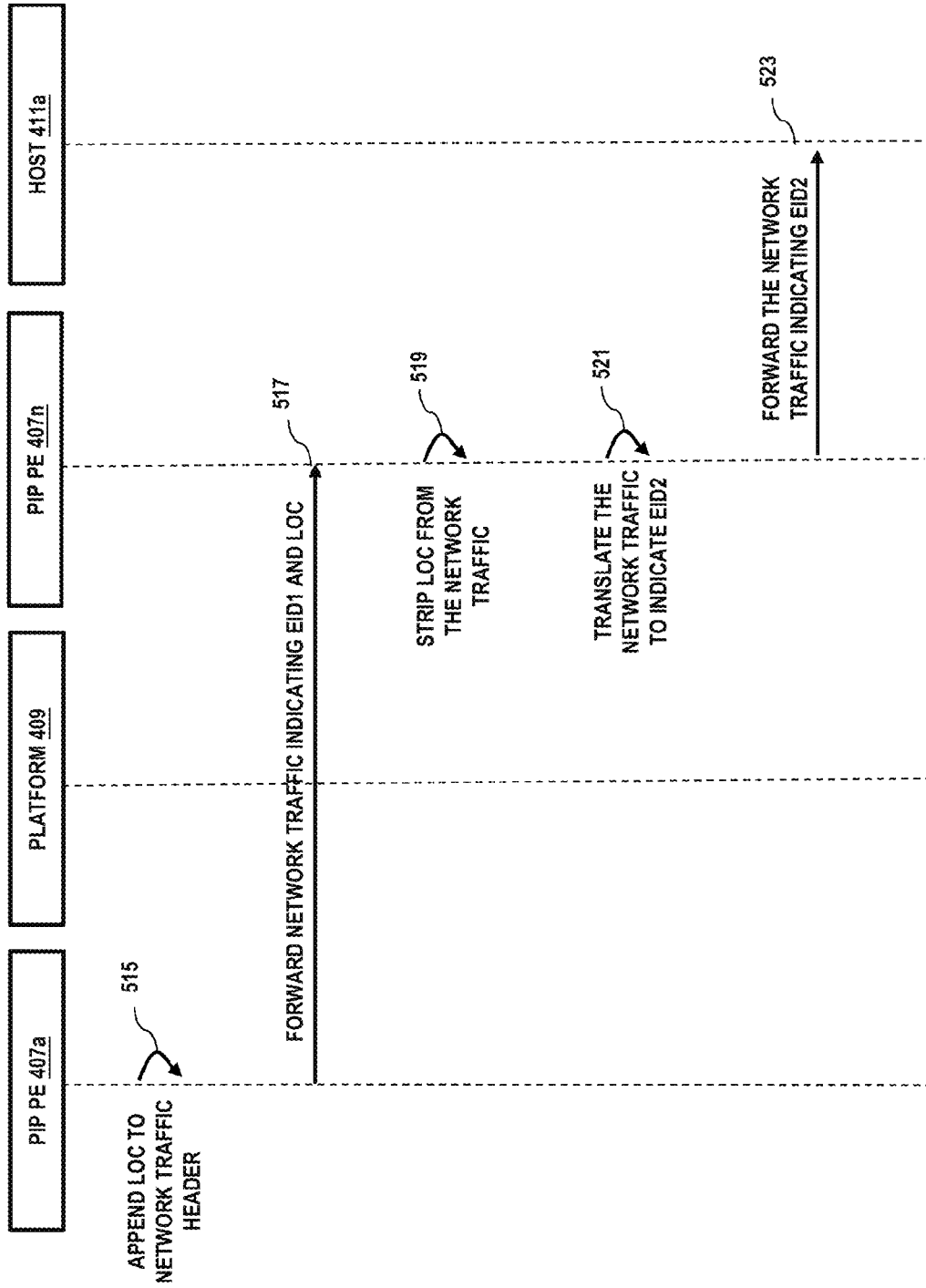

After the mapping of steps 509 and 513, the network traffic (and subsequent network traffic) received by PIP PE 407*a* from VM instance 403*a* of cloud 401 is appended, as in step 515 of FIG. 5B, to indicate the LOC address and forwarded to the LOC address. As shown, the PIP PE 407*a* appends the network traffic. It is contemplated that a (cloud based) virtual machine or other NAT device could additionally or alternatively adjust a header of the network traffic. For example, the PIP PE 407*a* initiates (e.g., send an indication of the LOC address, send a request with the EID1, etc.) a (cloud based) virtual machine or other NAT device to adjust a header of network traffic by sending an indication of the LOC address, sending a request with the EID1, and the like. The core network 405 then forwards, as in step 517, the network traffic to PIP PE 407*n*. For instance, core network 405 is configured to use a location/identifier topology (e.g., LISP) and the LOC address is appended to allow core network 405 to forward the network traffic according to a location indicated by the LOC address. Next, PIP PE 407*n* strips, as in step 519, the LOC address from the network traffic. For instance, hosts 411 (and cloud 401) are not configured to support a LOC address and thus, the LOC address is striped to allow network traffic to be exchanged with the hosts 411 (and cloud 401). The PIP PE 407*n* also translates, as in step 521, the network traffic to indicate EID2. For instance, the PIP PE 407*n* accesses table 413*n* and translates the network traffic indicating the EID1 address (e.g., 166.34.0.1) to indicate the translation address (e.g., 20.1.1.1). In some embodiments, steps 519 and 521 are combined and the PIP PE 407*n* strips the LOC address and EID from network traffic and appends a translation address. For instance, the PIP PE 407*n* receives network traffic from cloud 401 indicating a LOC address (e.g., 10.1.1.2) and EID (e.g., 166.34.0.1) of table 413*n* and forwards the network traffic to indicate only a translation address (e.g., 20.1.1.1). As shown, the PIP PE 407*n* strips (and appends a translation address of) the network traffic. It is contemplated that a (cloud based) virtual machine or other NAT device could additionally or alternatively adjust a header of the network traffic. Next, the PIP PE 407*n* forwards, as in step 523, translated network traffic indicating only the translation address (e.g., 20.1.1.1) of table 413*n* to host 411*a*. As such, customer information may be centralized on mapping platform 409 and available for further use. Additionally, NAT functionality can be packaged with VPN functionality, resulting in simpler implementation.

Figure 6:
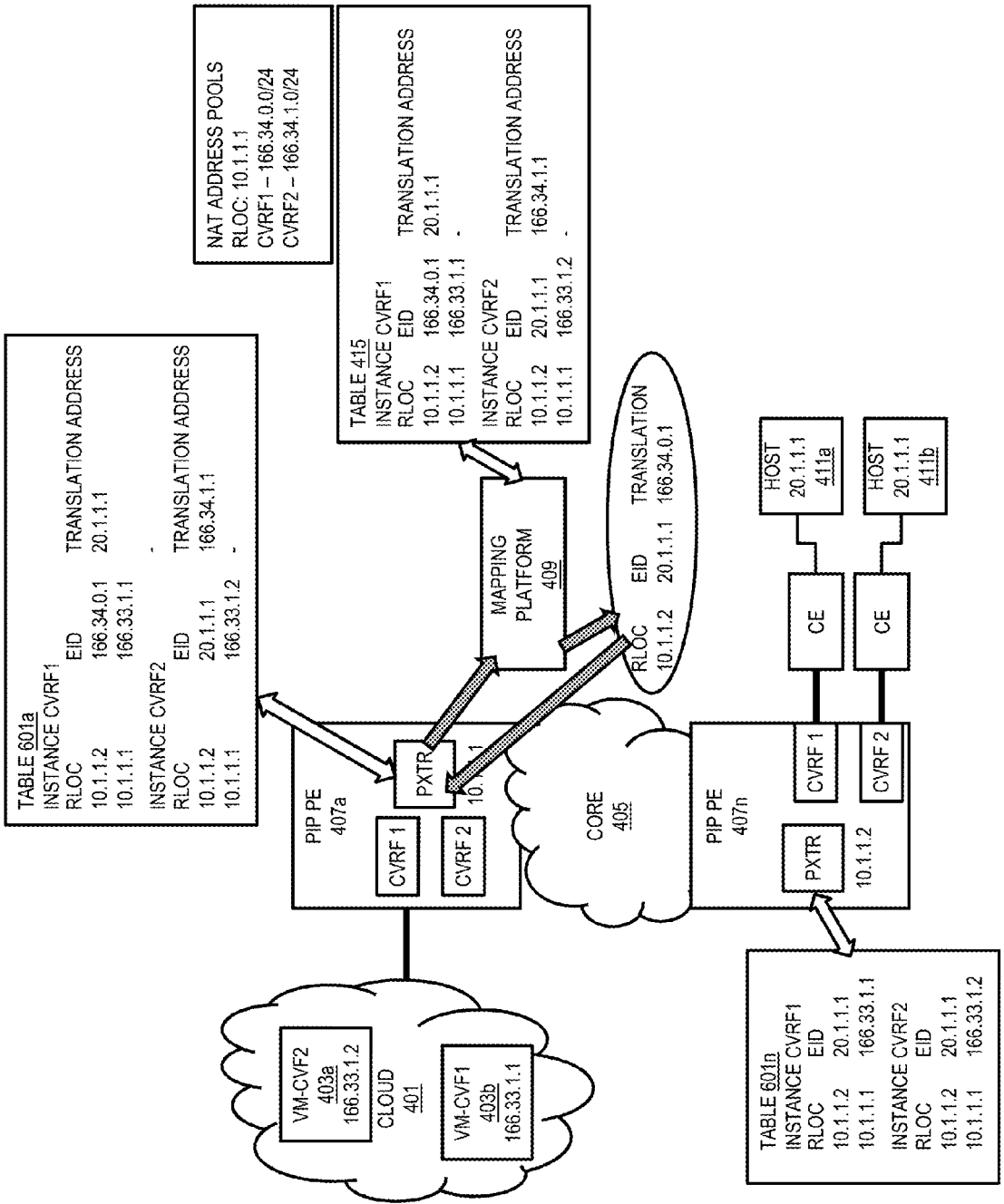
FIG. 6 is a diagram of a NAT process implemented at an ingress into a transport network, according to various embodiments.
Figure 7:
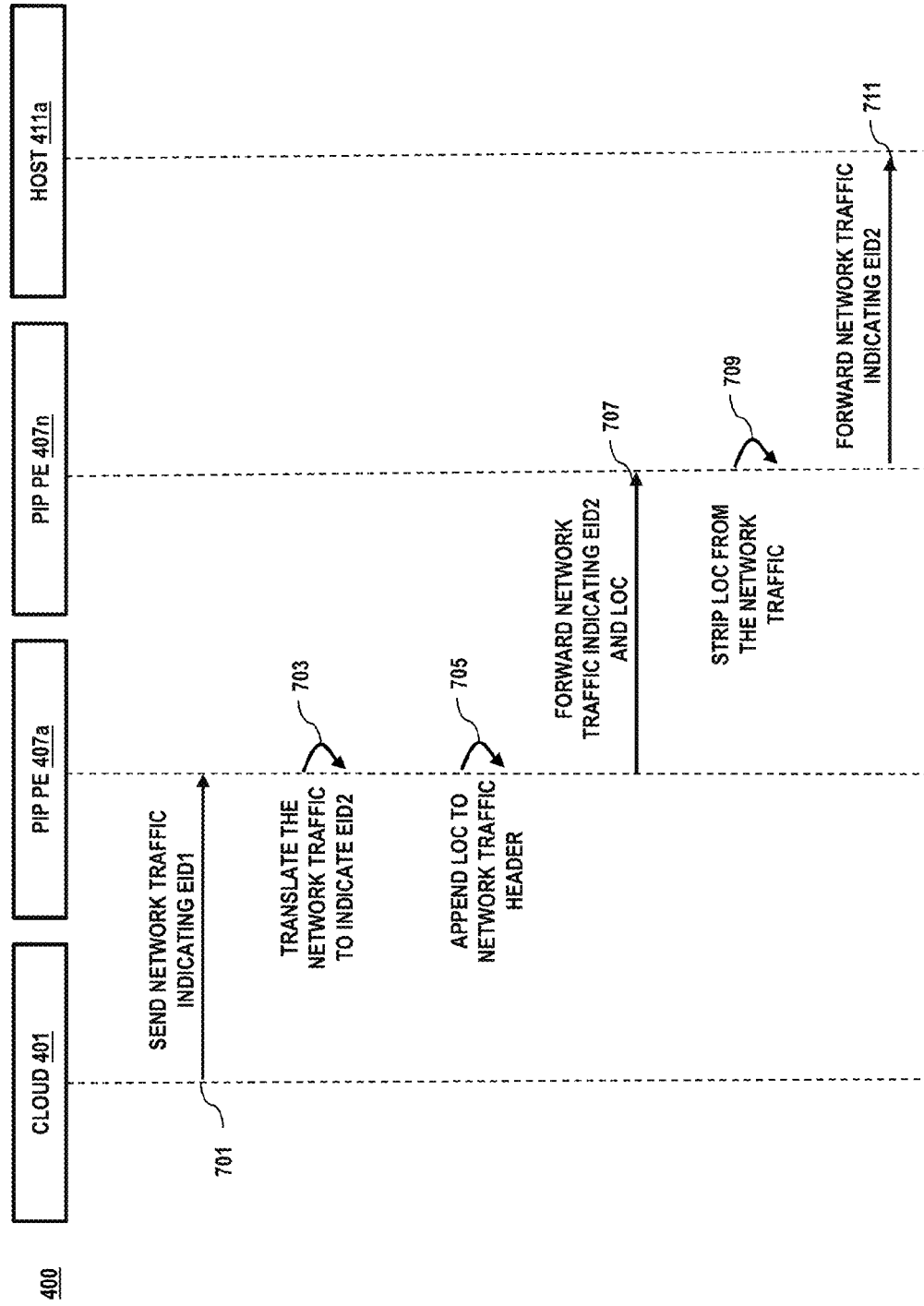
FIG. 7 is a ladder diagrams of a NAT process implemented at an ingress into a transport network, according to various embodiments.

In other instances, the platform 409 selects a router or PIP PE 407 directly connected to or near the cloud 401 to perform the translation. Adverting to FIG. 6, steps 501-513 are similarly performed except that the platform 409 has selected PIP PE 407*a* to perform the translation, resulting in tables 601. As such, the PIP PE 407*a* receives network traffic indicating EID1 (e.g., 166.34.0.1), in step 701 of FIG. 7, and translates, in steps 703 and 705, the network traffic to indicate EID2 (e.g., 20.1.1.1) and a LOC address (e.g., 10.1.1.2) before forwarding, in step 707, to PIP PE 407*n*. The PIP PE 407*n* then strips, in step 709, the LOC address from the network traffic prior to forwarding, as in step 711, to the host 411*a*. As previously noted a (cloud based) virtual machine or other NAT device could additionally or alternatively adjust a header of the network traffic.

The processes described herein for distributing and vitalizing a NAT may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Figure 8:
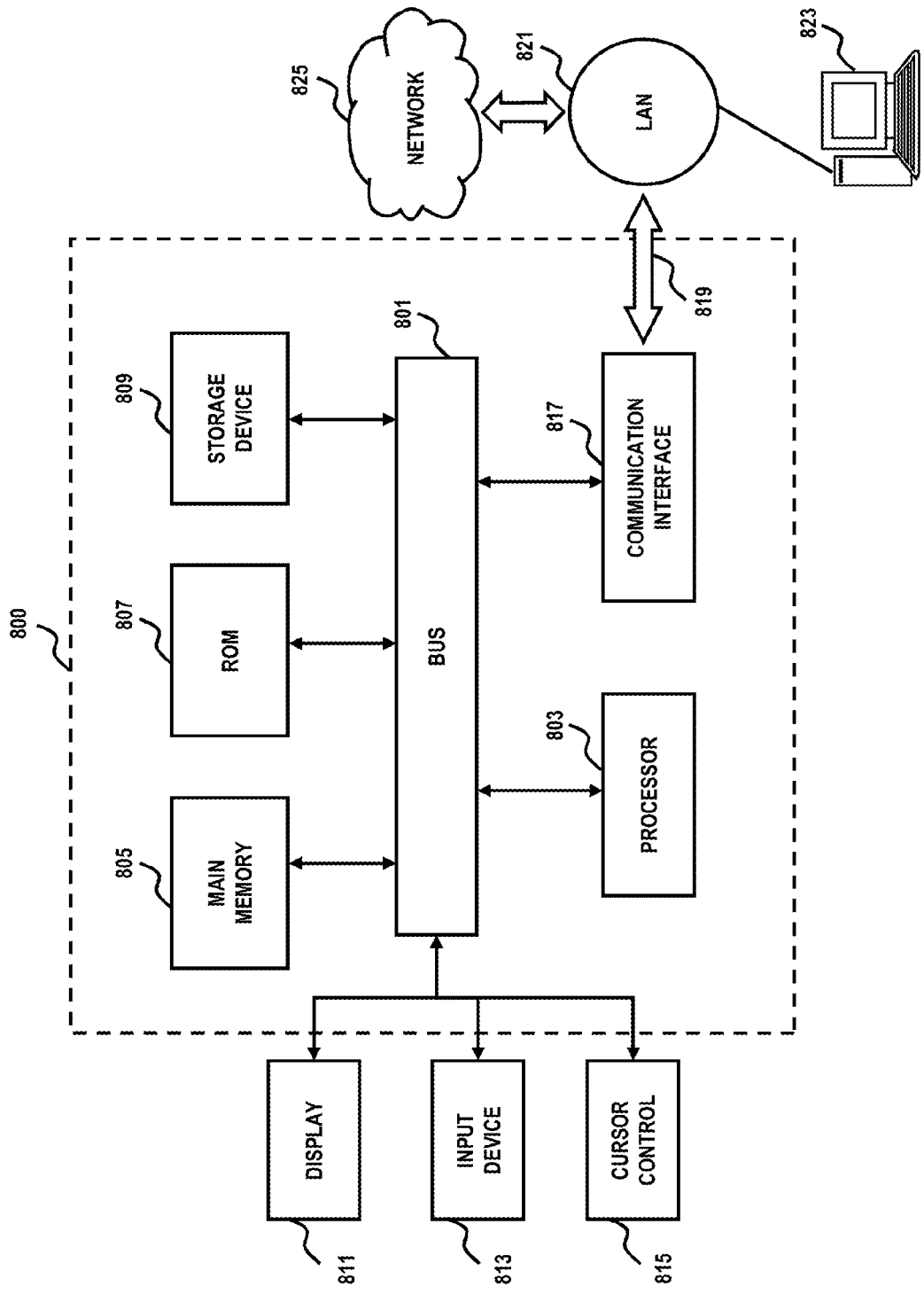
FIG. 8 is a diagram of a computer system that can be used to implement various embodiments.

FIG. 8 is a diagram of a computer system that can be used to implement various exemplary embodiments. The computer system 800 includes a bus 801 or other communication mechanism for communicating information and one or more processors (of which one is shown) 803 coupled to the bus 801 for processing information. The computer system 800 also includes main memory 805, such as a random access memory (RAM) or other dynamic storage device, coupled to the bus 801 for storing information and instructions to be executed by the processor 803. Main memory 805 can also be used for storing temporary variables or other intermediate information during execution of instructions by the processor 803. The computer system 800 may further include a read only memory (ROM) 807 or other static storage device coupled to the bus 801 for storing static information and instructions for the processor 803. A storage device 809, such as a magnetic disk, flash storage, or optical disk, is coupled to the bus 801 for persistently storing information and instructions.

The computer system 800 may be coupled via the bus 801 to a display 811, such as a cathode ray tube (CRT), liquid crystal display, active matrix display, or plasma display, for displaying information to a computer user. Additional output mechanisms may include haptics, audio, video, etc. An input device 813, such as a keyboard including alphanumeric and other keys, is coupled to the bus 801 for communicating information and command selections to the processor 803. Another type of user input device is a cursor control 815, such as a mouse, a trackball, touch screen, or cursor direction keys, for communicating direction information and command selections to the processor 803 and for adjusting cursor movement on the display 811.

According to an embodiment of the invention, the processes described herein are performed by the computer system 800, in response to the processor 803 executing an arrangement of instructions contained in main memory 805. Such instructions can be read into main memory 805 from another computer-readable medium, such as the storage device 809. Execution of the arrangement of instructions contained in main memory 805 causes the processor 803 to perform the process steps described herein. One or more processors in a multi-processing arrangement may also be employed to execute the instructions contained in main memory 805. In alternative embodiments, hard-wired circuitry may be used in place of or in combination with software instructions to implement the embodiment of the invention. Thus, embodiments of the invention are not limited to any specific combination of hardware circuitry and software.

The computer system 800 also includes a communication interface 817 coupled to bus 801. The communication interface 817 provides a two-way data communication coupling to a network link 819 connected to a local network 821. For example, the communication interface 817 may be a digital subscriber line (DSL) card or modem, an integrated services digital network (ISDN) card, a cable modem, a telephone modem, or any other communication interface to provide a data communication connection to a corresponding type of communication line. As another example, communication interface 817 may be a local area network (LAN) card (e.g. for Ethernet™ or an Asynchronous Transfer Mode (ATM) network) to provide a data communication connection to a compatible LAN. Wireless links can also be implemented. In any such implementation, communication interface 817 sends and receives electrical, electromagnetic, or optical signals that carry digital data streams representing various types of information. Further, the communication interface 817 can include peripheral interface devices, such as a Universal Serial Bus (USB) interface, a PCMCIA (Personal Computer Memory Card International Association) interface, etc. Although a single communication interface 817 is depicted in FIG. 8, multiple communication interfaces can also be employed.

The network link 819 typically provides data communication through one or more networks to other data devices. For example, the network link 819 may provide a connection through local network 821 to a host computer 823, which has connectivity to a network 825 (e.g. a wide area network (WAN) or the global packet data communication network now commonly referred to as the "Internet") or to data equipment operated by a service provider. The local network 821 and the network 825 both use electrical, electromagnetic, or optical signals to convey information and instructions. The signals through the various networks and the signals on the network link 819 and through the communication interface 817, which communicate digital data with the computer system 800, are exemplary forms of carrier waves bearing the information and instructions.

The computer system 800 can send messages and receive data, including program code, through the network(s), the network link 819, and the communication interface 817. In the Internet example, a server (not shown) might transmit requested code belonging to an application program for implementing an embodiment of the invention through the network 825, the local network 821 and the communication interface 817. The processor 803 may execute the transmitted code while being received and/or store the code in the storage device 809, or other non-volatile storage for later execution. In this manner, the computer system 800 may obtain application code in the form of a carrier wave.

The term "computer-readable medium" as used herein refers to any medium that participates in providing instructions to the processor 803 for execution. Such a medium may take many forms, including but not limited to computer-readable storage medium ((or non-transitory)—e.g., non-volatile media and volatile media), and transmission media. Non-volatile media include, for example, optical or magnetic disks, such as the storage device 809. Volatile media include dynamic memory, such as main memory 805. Transmission media include coaxial cables, copper wire and fiber optics, including the wires that comprise the bus 801. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

Figure 9:
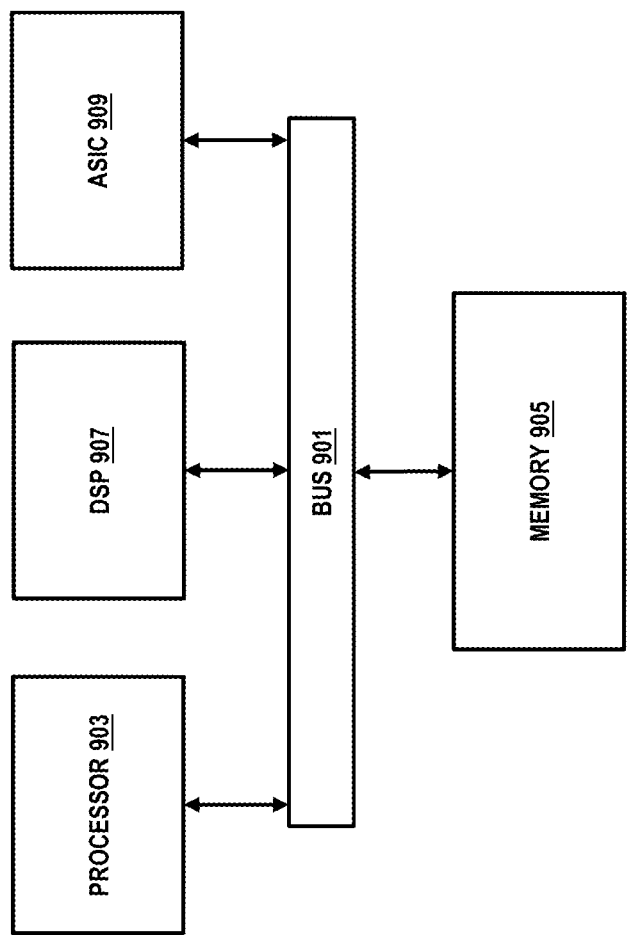
FIG. 9 is a diagram of a chip set that can be used to implement various embodiments.

FIG. 9 illustrates a chip set or chip 900 upon which an embodiment of the invention may be implemented. Chip set 900 is programmed to enable distributing and vitalizing a NAT process as described herein and includes, for instance, the processor and memory components described with respect to FIG. 9 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 900 can be implemented in a single chip. It is further contemplated that in certain embodiments the chip set or chip 900 can be implemented as a single "system on a chip." It is further contemplated that in certain embodiments a separate ASIC would not be used, for example, and that all relevant functions as disclosed herein would be performed by a processor or processors. Chip set or chip 900, or a portion thereof, constitutes a means for performing one or more steps of enabling distributing and vitalizing a NAT process.

In one embodiment, the chip set or chip 900 includes a communication mechanism such as a bus 901 for passing information among the components of the chip set 900. A processor 903 has connectivity to the bus 901 to execute instructions and process information stored in, for example, a memory 905. The processor 903 may include one or more processing cores with each core configured to perform independently. A multi-core processor enables multiprocessing within a single physical package. Examples of a multi-core processor include two, four, eight, or greater numbers of processing cores. Alternatively or in addition, the processor 903 may include one or more microprocessors configured in tandem via the bus 901 to enable independent execution of instructions, pipelining, and multithreading. The processor 903 may also be accompanied with one or more specialized components to perform certain processing functions and tasks such as one or more digital signal processors (DSP) 907, or one or more application-specific integrated circuits (ASIC) 909. A DSP 907 typically is configured to process real-world signals (e.g., sound) in real time independently of the processor 903. Similarly, an ASIC 909 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 900 includes merely one or more processors and some software and/or firmware supporting and/or relating to and/or for the one or more processors.

The processor 903 and accompanying components have connectivity to the memory 905 via the bus 901. The memory 905 includes both dynamic memory (e.g., RAM, magnetic disk, writable optical disk, etc.) and static memory (e.g., ROM, CD-ROM, etc.) for storing executable instructions that when executed perform the inventive steps described herein to enable improved approaches for distributing and vitalizing a NAT. The memory 905 also stores the data associated with or generated by the execution of the inventive steps.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
   maintaining, by a mapping platform of a translation network, a mapping table associating first and second endpoint addresses of a device, the first and second endpoint addresses indicating the device for first and second routers of the translation network, respectively;
   maintaining, by the mapping platform, a routing table to route between the first and second routers of the translation network, the routing table indicating pathways or tunnels for routing traffic, the routing table associating the first and second routers with first and second location addresses, respectively, wherein the mapping table is separate from the routing table;
   determining, by the mapping platform, a load balance for translating packet headers between the first and second routers;
   selecting, by the mapping platform, one of the first router, the second router, or a router exchanging network traffic between the first and second routers, for forwarding the first and/or second endpoint address, the selecting based on the determined load imbalance; and
   forwarding the first and/or second endpoint addresses to the selected router, wherein the selected router translates network traffic indicating the first endpoint address to indicate the second endpoint address, the first end point address located in a first virtual private network, and the second end point address located in a second virtual private network.

2. The method of claim 1, wherein the first mapping table is associated with a first network, the method further comprising:
   maintaining a second mapping table associated with a second network, the second mapping table associating a third endpoint address of a second device and the second location address.

3. The method of claim 2, wherein first and third endpoint addresses are identical.

4. The method of claim 3, wherein the first and second mapping tables are associated with first and second virtual private networks, respectively, and the first and second routers route according to a Locator/Identifier Separation Protocol (LISP).

5. The method of claim 1, wherein the second router is the selected router, the second router maintains a cache associating the first and second endpoint addresses, and the translation of network traffic indicating the first endpoint address to indicate the second endpoint address is according to the cache.

6. The method of claim 1 further comprising:
   receiving a request from the first router indicating the first endpoint address;
   determining the second location address based on the mapping table and the received first endpoint address; and
   causing, at least in part, a forwarding of the determined second location address to the first router.

7. The method of claim 1, wherein the second router strips, prior to forwarding to the device, the second location address from network traffic indicating the device.

8. The method of claim 1 further comprising the first and second routers being internal routers.

9. The method of claim 1 further comprising the first and second routers being proxy tunnel routers.

10. An apparatus comprising:
    at least one processor; and
    at least one memory including computer program code for one or more programs,
    the at least one memory and the computer program code configured to, with the at least one processor, cause the apparatus to perform at least the following,
    maintain in a mapping platform of a translation network, a mapping table associating first and second endpoint addresses of a device, the first and second endpoint addresses indicating the device for first and second routers, respectively;
    maintain by a routing module of the mapping platform, a routing table for to route between the first routers of a first network and second routers of the translation network, the routing table indicating pathways or tunnels for routing traffic, the routing table associating the first and second routers with first and second location addresses, respectively, wherein the mapping table is separate from the routing table;
    determine, by the mapping platform, a load balance for translating packet headers between the first and second routers;
    select, by the mapping platform, one of the first router, the second router, or a router exchanging network traffic between the first and second routers, for forwarding the first and/or second endpoint address, the selecting based on the determined load imbalance; and
    forward the first and/or second endpoint addresses to the selected router, wherein the selected router translates network traffic indicating the first endpoint address to indicate the second endpoint address, the first end point address located in a first virtual private network, and the second end point address located in a second virtual private network.

11. The apparatus according to claim 10, wherein the first mapping table is associated with a first network and the apparatus is further caused to:
maintain a second mapping table associated with a second network, the second mapping table associating a third endpoint address of a second device and the second location address.

12. The apparatus according to claim 11, wherein first and third endpoint addresses are identical.

13. The apparatus according to claim 12, wherein the first and second mapping tables are associated with first and second virtual private networks, respectively, and the first and second routers route according to a Locator/Identifier Separation Protocol (LISP).

14. The apparatus according to claim 10, wherein the second router is the selected router, the second router maintains a cache associating the first and second endpoint addresses, and the translation of network traffic indicating the first endpoint address to indicate the second endpoint address is according to the cache.

15. The apparatus according to claim 10, wherein the apparatus is further caused to:
receive a request from the first router indicating the first endpoint address;
determine the second location address based on the mapping table and the received first endpoint address; and
cause, at least in part, a forwarding of the determined second location address to the first router.

16. The apparatus according to claim 10, wherein the second router strips, prior to forwarding to the device, the second location address from network traffic indicating the device.

17. A system comprising:
a mapping agent configured to:
maintain by a mapping module a translation network, a mapping table associating first and second endpoint addresses and a location address for a device;
determine a load balance for translating packet headers between a plurality of routers;
select, by the mapping platform, one of an ingress router, an egress router, or a router exchanging network traffic between the ingress and the egress routers, for forwarding the first and/or second endpoint address, the selecting based on the determined load imbalance; and
forward the first and/or second endpoint addresses to the selected router of the translation network;
the ingress router being configured to:
receive network traffic indicating the first endpoint address;
initiate, at least in part, a translation of the received network traffic to further indicate the location address; and
forward the translated network traffic to the location address; and
the egress router being configured to:
receive the forwarded network traffic;
initiate, at least in part, a stripping of the location address from the received network traffic; and
forward the stripped network traffic to the device, the stripped network traffic indicating the second end point address, wherein the selected router initiates, at least in part, a translation of the received network traffic indicating the first endpoint address to indicate the second endpoint address,
the mapping agent being further configured to:
maintain a second mapping table for a second network, the second mapping table associating a third endpoint address and the location address for a second device, wherein the third endpoint address and the second endpoint addresses are identical,
the ingress router being further configured to:
maintain, by a routing module of the mapping platform, first and second routing tables for the first and second networks, respectively, the first table associating the first endpoint address of the first device with at least the location address and the second table associating the third endpoint address of the second device with at least the location address, the first and second routing tables indicating pathways or tunnels for routing traffic; and
the egress router being further configured to:
maintain third and fourth routing tables for the first and second networks, respectively, the third table associating the second endpoint address of the first device with at least the location address and the fourth table associating the third endpoint address of the second device with at least the location address, the first end point address located in a first virtual private network, and the second end point address located in a second virtual private network.

18. The system according to claim 17, wherein the egress router is the selected router, the system further comprising:
the egress router being further configured to:
receive at least the first endpoint address from the mapping agent; and
maintain the third routing table to further associate the second endpoint address of the first device with at least the received first endpoint address, wherein the translation of network traffic indicating the first endpoint address to indicate the second endpoint address is according to the third routing table.

19. The system according to claim 17, wherein the first endpoint address is a public internet protocol address, the second endpoint address is a private internet protocol address, and the first and second networks are virtual private networks.

20. The system according to claim 17, further comprising:
the mapping agent being further configured to:
receive a request from the ingress router indicating the first endpoint address; and
determine the location address based on the mapping table and the received first endpoint address; and
the egress router being further configured to:
receive an indication of the request from the mapping agent; and
forward a reply to the ingress router indicating at least the location address, wherein the translation of the received network traffic by the ingress router is according to the indicated location address of the reply.

21. The system according to claim 17, further comprising:
one or more third routers being configured to exchange network traffic between the ingress and egress routers; and
the mapping agent being further configured to:
select the ingress, egress, or one of the one or more third routers based on a load balance for translating packet headers between the ingress, egress, and one or more third routers.

* * * * *